United States Patent
Good et al.

(10) Patent No.: US 8,190,505 B2
(45) Date of Patent: May 29, 2012

(54) SYSTEM AND METHOD FOR PROVIDING A FINANCIAL PRODUCT LINKED TO A SPECIFIC RETURN

(75) Inventors: Christopher Good, New York, NY (US); Gerald C. Altomare, Saddle River, NJ (US)

(73) Assignee: Morgan Stanley, New York, NY (US)

( * ) Notice: Subject to any disclaimer, the term of this patent is extended or adjusted under 35 U.S.C. 154(b) by 1632 days.

(21) Appl. No.: 10/402,233

(22) Filed: Mar. 27, 2003

(65) Prior Publication Data
US 2004/0059656 A1    Mar. 25, 2004

Related U.S. Application Data

(60) Provisional application No. 60/368,475, filed on Mar. 27, 2002.

(51) Int. Cl.
*G06Q 40/00* (2012.01)
(52) U.S. Cl. .......................................................... 705/37
(58) Field of Classification Search ............... 705/35–45
See application file for complete search history.

(56) References Cited

U.S. PATENT DOCUMENTS

| | | | |
|---|---|---|---|
| 6,263,321 B1 | 7/2001 | Daughtery, III | 705/36 |
| 2003/0225658 A1* | 12/2003 | Whaley | 705/36 |
| 2008/0222052 A1* | 9/2008 | Choueifaty | 705/36 R |

OTHER PUBLICATIONS

Int'l Search Report for PCT/US03/09384 dated Dec. 20, 2004.

Schwimmer, Anne, "Structured Note Buyers Turn to New Exotic Plays," *Investment Dealers Digest*, Aug. 22, 1994, vol. 60, No. 34, pp. 9.

Brady, Simon et al. "A Swap for All Yield Curves," *Corporate Finance*, Feb. 1994, No. 111, pp. 14-19.

Ingersoll Jr., Jonathan E., "Digital Contracts: Simple Tools for Pricing Complex Derivatives," *Journal of Business*, Jan. 2000, vol. 73, No. 1, pp. 67.

Browne, Sid, "The Risk and Rewards of Minimizing Shortfall Probability," *Journal of Portfolio Management*, Summer 1999, vol. 25, No. 4, pp. 76.

Brady Simon, "Caught Between a Rock and a Hard Place," *Corporate Finance*, Dec. 1994, No. 121, pp. 18-20.

Gilardi, Paolo et al., "The Use of Derivatives in Retail Investment Products," *Euromoney The 1999 Guide to Italy Supplement*, Jun. 1999, pp. 10-11.

"My Say: Derivatives—Local Black Financial Holes," *EDGE* (Malaysia), Nov. 9, 1998.

Merton, Robert, "Finance Theory and Future Trends: The Shift to Integration," *Financial Management*, Autumn 2000, vol. 29, No. 3, pp. 94.

Bensman, Miriam, "Tailor Your Trades With Exotics," *Futures*, Jul. 1994, vol. 23, No. 8, pp. 40.

(Continued)

*Primary Examiner* — Richard C Weisberger
(74) *Attorney, Agent, or Firm* — Weitzman Law Offices, LLC

(57) ABSTRACT

A method for providing a financial contract having a payout amount based on a specific return on an asset for a performance period. The method includes the step of determining the total return, risk-free return and common factor return associated with the asset over the performance period. Next, a specific return on the asset over the performance period based on the total return, risk-free return and common factor return is calculated. Finally, the payout amount is provided if the specific return meets payout criteria.

30 Claims, 1 Drawing Sheet

OTHER PUBLICATIONS

"Derivatives (Number of pension funds increases in Spain to reach growing Number of retail investors; derivatives market investors aim for mixture of equity and fixed income)," *Euromoney Guide to Spain Supplement*, Sep. 1998, pp. 6+.

Parsley, Mark, "Exotics Enter the Mainstream," *Euromoney*, Mar. 1997, No. 335, pp. 127-130.

"European Equities, The Great Equity Rebalancing Act," *Euromoney Magazine*, Jan. 10, 1999, pp. 33-38.

Ku, Anne, "Betting on the Weather," *Global Energy Business*, Jul./Aug. 2001, vol. 3, No. 4, pp. 28.

Schwimmer, Anne, "Derivatives Dealers Struggle to Hedge Tricky Digital Options," *Investment Dealers Digest*, Oct. 10, 1994, vol. 60, No. 41, pp. 10.

Carmel, Management of Global Information Technology, Oct. 2000, pp. 1-4.

Int'l Search Report dated Oct. 14, 2003 for PCT/US03/09384.

* cited by examiner

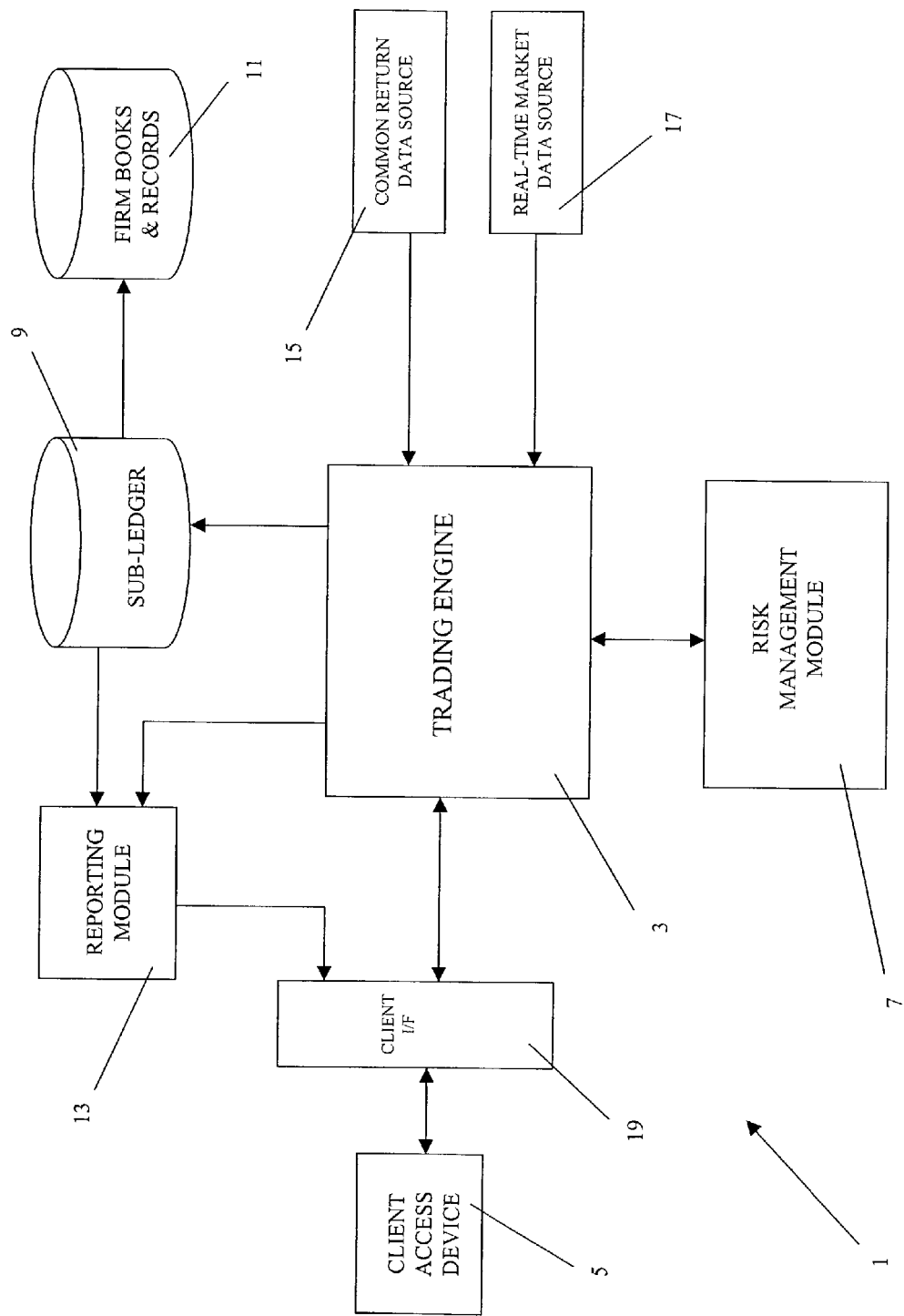

SYSTEM AND METHOD FOR PROVIDING A FINANCIAL PRODUCT LINKED TO A SPECIFIC RETURN

CROSS-REFERENCE TO RELATED APPLICATION

This application claims the benefit of the filing date of U.S. provisional application Ser. No. 60/368,475 entitled "System and Method for Providing a Financial Product Linked to a Specific Return," which was filed on Mar. 27, 2002.

BACKGROUND

The following invention relates to a financial product and, in particular, to a system and method for providing investors with a financial product that provides a return that is linked to a specific return on an underlying asset.

It is an investment goal to achieve a return that is greater than prevailing market-based rates. Furthermore, a benchmark by which investment managers are typically evaluated is whether the investment strategy used by the manager has produced market-beating returns. For example, mutual funds that invest in stocks that are listed in the S&P 500 are considered to outperform the "market" if those funds outperform the S&P 500 index. Typically, the funds that beat market returns do so based on the fund manager's superior insights and stock-picking skills. The fund manager uses these superior skills and insights to identify the specific (non-market) return (i.e., alpha) associated with a particular stock to determine whether it meets the fund's selection criteria. Thus, it is desirable for investors and investment managers to be able to identify the specific return portion, or alpha component, of a stock's total return and apply an investment strategy to exploit this specific return.

A number of strategies exist for capturing alpha. For example, a fund manager may focus on small-capitalization stocks that are not followed by many market analysts and, with good research, may be able to build a portfolio of these small-capitalization stocks that beats the market. A potential drawback of this approach, however, is that small companies maybe more sensitive to economic downturns and their stocks may fall faster than the stocks of large companies in a recession.

Another strategy used to capture alpha is called a "long-short equity" strategy in which a fund manager buys underpriced stocks and sells overpriced stocks in equal amounts thereby eliminating industry and market effects and resulting in a return tied to the stocks' alpha. A drawback of this strategy is that it requires numerous transactions to establish and maintain a market neutral position. In addition, there is the expense in terms of the time and money needed to secure sufficient stock to borrow for the short positions. Also, there are many "common factor" exposures that affect many stocks. For a long-short equity manager to neutralize his/her position against these undiversifiable risks is extremely challenging and reduces the investor's focus on finding mispriced securities.

Accordingly, it is desirable to have a system and method for providing investors with a financial product that gives a return that is linked purely to a specific return on an underlying asset.

SUMMARY OF THE INVENTION

The present invention is directed to overcoming the drawbacks of the prior art. The present invention is a method for providing a financial contract having a payout amount based on a specific return on an asset. The method includes the step of receiving an excess return (defined as the difference between total return and the risk-free rate) associated with the asset for a performance period. Next, a common factor return associated with the asset for the performance period is received. Next, a specific return on said asset for the performance period based on the excess return and the common factor return is calculated. Finally, the payout amount is provided if the specific return meets certain payout criteria.

In an exemplary embodiment, a first payout amount is provided if the specific return is greater than zero; a second payout amount is provided if the specific return is less than zero.

In another exemplary embodiment, a premium for the financial contract is received and the first payout amount is greater than the premium.

In yet another exemplary embodiment, the second payout amount is less than the premium.

In still yet another exemplary embodiment, a premium for the financial contract is received and the second payout amount is greater than the premium.

In an exemplary embodiment, the first payout amount is less than the premium.

In another exemplary embodiment, the payout amount is a function of the level of specific return over the performance period.

In yet another exemplary embodiment, a request to purchase said financial contract for a price is received, risk associated with the financial contract is determined and the payout amount based on relevant risk factors is adjusted.

In still yet another exemplary embodiment, the risk factors associated with the financial contract are offset with corresponding risk factors associated with another financial contract.

In an exemplary embodiment, a plurality of outstanding financial contracts is included and it is determined whether the plurality of outstanding financial contracts are priced in accordance with a variety of risk factors.

In another exemplary embodiment, the potential risk factors are selected from a group of factors including industry membership, price momentum, earnings yield, foreign exchange exposure, volatility, dividend yield, growth rate, leverage, trading volume, earnings variability, size, stock price, credit outlook, stock loan temperature, historic beta, predicted beta, and time-series predictability of specific return, among others.

In yet another exemplary embodiment, the payout amount is adjusted based on a variety of risk factors.

In still yet another exemplary embodiment, the payout amount is lowered to compensate for the risk factors.

In an exemplary embodiment, the price (or option premium) is increased to compensate for the risk factors.

In another exemplary embodiment, the performance period consists of a plurality of units of time, a specific return is calculated for the asset for each of the plurality of units of time and the calculated specific return on all of the plurality of units of time is calculated.

In yet another exemplary embodiment, the units of time are days.

In still yet another exemplary embodiment, the performance period is one week.

In an exemplary embodiment, the asset is a U.S. equity security.

In an exemplary embodiment, the asset is a non-U.S. equity security.

In an exemplary embodiment, the asset is a U.S. fixed income security such as a U.S. Treasury bill, note or bond, or a credit-risky corporate bond.

In an exemplary embodiment, the asset is a non-U.S. fixed income security such as a sovereign bond, or a credit-risky foreign corporate bond.

In another exemplary embodiment, the financial contract has a notional amount and the notional amount is limited to a notional amount ceiling.

In yet another exemplary embodiment, the notional amount ceiling is $25,000,000.

In still yet another exemplary embodiment, the asset is a large-capitalization security having a minimum daily traded value of $1,000,000.

In an exemplary embodiment, the minimum daily traded value required to make a stock eligible to have an options contract the payout of which is linked to specific return is $1,000,000.

In another exemplary embodiment, the payout amount is reported.

Under the present invention, a system is provided for providing a financial contract having a payout amount based on a specific return on an asset. The system includes a market data source for receiving a total return associated with the asset for a performance period. The system also includes a market data source for receiving the risk-free rate for a performance period. Also included is a common factor source for receiving a common factor return associated with the asset for the performance period. A trading engine is included for calculating a specific return on the asset for the performance period based on the asset's total return, the risk-free rate and the asset's common factor return and providing the payout amount if the specific return meets the relevant payout criteria.

In an exemplary embodiment, the trading engine receives a request to purchase the financial contract for a price and a risk management module in communication with the trading engine is included wherein the risk management module determines the risks associated with the financial contract and adjusts the payout amount or premium based on these risks.

In another exemplary embodiment, the risk management module offsets the risk factors associated with the financial contract with the corresponding risk factors associated with another financial contract.

In yet another exemplary embodiment, a plurality of outstanding financial contracts is included and the risk management module determines whether the plurality of outstanding financial contracts are priced in accordance with a variety of risk factors.

In still yet another exemplary embodiment, the risk management module adjusts the payout amount based on a variety of risk factors.

In an exemplary embodiment, the risk management module adjusts the payout amount by lowering the payout amount to compensate for the exposure to a variety of risk factors.

In another exemplary embodiment, the risk management module adjusts the payout amount by increasing the price to compensate for the exposure to the risk factors.

In yet another exemplary embodiment, the performance period consists of a plurality of units of time and the trading engine calculates a specific return on the asset for each of the plurality of units of time and calculates the specific return for all of the plurality of units of time by compounding the gross specific returns and subtracting one.

In still yet another exemplary embodiment, a reporting module is included for receiving the payout amount from the trading engine and reporting the payout amount.

In an exemplary embodiment, the financial contract includes transaction details as well as a sub-ledger database for storing the transactions details.

Accordingly, a method and system are provided for presenting investors with a financial product that gives a return that is linked to a specific return on an underlying asset.

The invention accordingly comprises the features of construction, combination of elements and arrangement of parts that will be exemplified in the following detailed disclosure, and the scope of the invention will be indicated in the claims. Other features and advantages of the invention will be apparent from the description, the drawings and the claims.

DESCRIPTION OF THE DRAWINGS

For a fuller understanding of the invention, reference is made to the following description taken in conjunction with the accompanying drawings, in which:

FIG. 1 is a block diagram of a system for providing a financial product that generates a return that is linked to a specific return on an underlying asset.

DETAILED DESCRIPTION OF THE PREFERRED EMBODIMENTS

Referring now to FIG. 1, there is shown a system 1 for providing a financial product that generates a return that is linked to a specific return on an underlying asset. More specifically, the financial product provided in the present invention is a contract that provides a payout that is a function of the specific return on an underlying stock over a performance period. Generally, the specific return on a stock is the portion of a stock's total return in excess of the risk-free rate that is attributable to factors unique to that particular stock. The specific return derives from stock-specific events such as a CEO's resignation, a legal judgment, corporate earnings (to the extent that they are not influenced by industry factors) or some other event that is unique to the company issuing the stock. Because the specific return on a stock depends on these unique events, specific returns are theoretically uncorrelated between stocks in a given period and for a given stock over multiple periods.

In contrast, the total return on a stock includes a common factor return that is attributable to factors that the stock has in common with other stocks in the marketplace. Common factor returns are attributable to effects that influence many stocks in the marketplace such as macroeconomic factors (e.g., interest rate movements, oil prices and environmental regulations) and fundamental factors (e.g., book-to-market ratio, market capitalization and volatility of stock return). Because common factor returns are linked to factors that influence many stocks in the marketplace, exposure to these common factors occurs across stocks, and is the source of cross-stock contemporaneous correlation.

The specific and common factor returns for a given stock are determined using factor models that are well known in the art. These models generally apply multivariate regression techniques to a universe of stocks in order to calculate the specific and common returns for the stock. Specific and common factor return information is available as a service from vendors such as Barra Inc. (2100 Milvia St, Berkeley, Calif. 94704, http:/www.barra.com) or Northfield Information Services (184 High Street, Boston, Mass. 02110, http://vww.northinfo.com). Vendor factor models proxy for the true, but unknown, theoretical model.

The financial contract of the present invention provides an investor with a payout based on the specific return on a particular stock (i.e., its alpha) over a selected performance period. In one embodiment (as will be described in greater detail below), the financial contract is a digital option that provides an investor with a positive return if the investor correctly predicts the sign (positive or negative) of the specific return on a given stock for a particular performance period. If the investor chooses the stock's alpha incorrectly, the payout on the contract will be $0. Thus, the financial contract of the present invention (hereinafter "ALFAs (Alpha-Linked Future Appreciation securities) contracts") enables investors to exploit their knowledge and/or stock-picking skill to achieve market-beating returns.

In order to provide investors with the financial product of the present invention, system 1 includes a trading engine 3 that receives and processes orders from clients for ALFAs contracts linked to particular underlying stocks. Trading engine 3 stores all ALFAs transaction information in a sub-ledger database 9. Initially, trading engine 3 provides a client operating a client access device 5 (via client interface 19) with a list of ALFAs contracts that are available for upcoming performance periods. For example, ALFAs contracts may be made available for a 1-week performance period that begins 1-week, 2-weeks, 3-weeks or 4-weeks in the future. Alternatively, ALFAs contracts may have a longer or shorter performance period and/or may be for performance periods that are earlier or later in time. Also, each ALFAs contract is designated as either an ALFAs+ contract (in which case the client receives a payout if the specific return during the performance period is positive) or an ALFAs− contract (in which case the client receives a payout if the specific return during the performance period is negative).

The premium the client pays for an ALFAs contract is set as desired by the financial institution that is selling ALFAs contracts. It is preferred that the price set for the ALFAs contracts takes into account the total risk the financial institution is exposed to as a result of issuing ALFAs contracts. The risks the financial institution is exposed to as a result of issuing ALFAs contracts depends on the type and total number of contracts purchased by clients from the financial institution, as will now be explained.

System 1 includes a risk management module 7 for monitoring and managing the risk the financial institution is exposed to as a result of selling ALFAs contracts. Risk management module 7 is in communication with trading engine 3 and sub-ledger database 9 for the purpose of adjusting the price (i.e., premium or payout) quoted for any given ALFAs contract based on the type of ALFAs contract requested and the outstanding ALFAs contracts previously sold by the financial institution.

In one embodiment, risk management module 7 receives from trading engine 3 a request that trading engine 3 has received from a client to purchase an ALFAs contract for a particular underlying security. Risk management module 7 first determines if there is a transaction recorded in sub-ledger database 9 involving an identical ALFAs contract in all respects except for the direction of the binary event (e.g., if the trade request is for an ALFAs+ contract, risk management module 7 determines if a corresponding ALFAs− contract is in sub-ledger database 9). If a corresponding ALFAs contract is available, then the financial institution will be completely hedged with respect to the current client purchase request as a result of the offsetting transaction.

In another embodiment, risk management module 7 adjusts the pricing of the ALFAs contracts offered in order to provide clients additional incentives to purchase particular ALFAs contracts in which the risks associated with those contracts maybe offset by ALFAs contracts purchased by other clients.

For example, to encourage a client to purchase an ALFAs+ contract so that the risk to the financial institution is offset by an existing corresponding ALFAs− contract, risk management module 7 may adjust the contract payout on the ALFAs+ contract to be greater than that of the corresponding ALFAs− contract.

Consider an example. The financial institution sells an ALFAs+ contract to Counterparty A. The contract pays $180 if the specific return on stock Z for the following calendar month is positive; otherwise, the payout is $0. The financial institution charges Counterparty A a $100 premium for this contract. Counterparty B wants to purchase an ALFAs contract on Stock Z for the following calendar month, as well. Because an ALFAs− contract will perfectly offset the risk of the ALFAs+ contract sold to Counterparty A and an ALFAs+ contract will doubly compound the risk to the financial institution, the financial institution offers the contract to Counterparty B for a premium of $100 with a $190 payout if B chooses an ALFAs−, or a $150 payout if B chooses and ALFAs+.

In addition, another way to encourage a client to purchase an ALFAs[+] contract so that the risk to the financial institution is offset by an existing corresponding ALFAs[−] contract is for risk management module 7 to adjust the contract premium on the ALFAs[+] contract to be greater than that of the corresponding ALFAs[−] contract.

Consider an example. The financial institution sells an ALFAs+ contract to Counterparty A. The contract pays $200 if the specific return on stock Z for the following calendar month is positive; otherwise, the payout is $0. The financial institution charges Counterparty A a $120 premium for this contract. Counterparty B wants to purchase an ALFAs contract on Stock Z for the following calendar month, as well. Because an ALFAs− contract will perfectly offset the risk of the ALFAs contract sold to Counterparty A and an ALFAs+ will doubly compound the risk to the financial institution, the financial institution offers the contract to Counterparty B for a premium of $110 if B chooses an ALFAs−, or a $135 premium if B chooses and ALFAs+.

For the risk exposures associated with ALFAs contract purchases that are not hedged by offsetting risk exposures associated with other corresponding transactions, the risk to the financial institution is hedged primarily by the Law of Large Numbers. Simply put, if a certain event is supposed to happen with a probability p, then over a large number of trials, this event will occur exactly in proportion p. For example, if a $1 bet on N independent coin toss outcomes (i.e., heads or tails) yields $ 2/N for a win and $0 for a loss, then the number of winning contracts will follow a binomial distribution with parameters N and p=½ and having a mean of N/2 and a standard deviation of $$\frac{\sqrt{N}}{2}.$$

It follows then that the expected profit from the coin tosses is $0 and the standard deviation of the profit is $$\$\frac{1}{\sqrt{N}}.$$

Thus, for a $1 bet on one coin toss, the standard deviation is $1 (i.e., the bettor either wins or loses $1). For a $1 bet split equally over 100 coin tosses, however, the profit standard deviation is $0.10 (or 10%). For a $1 bet split equally over 5,000 coin tosses, the profit standard deviation is $0.014 (or 1.4%). This means that for 5,000 coin tosses, two-thirds of the time the profits are $0±1.4% of the total amount bet.

Similarly, with respect to ALFAs contracts, as the number of outstanding contracts increases, the volatility of the profit (both that of the financial institution who has written the contracts, and the counterparty who has purchased the contracts) as a percent of the total outstanding notional amount declines. For example, in any given performance period, 50% of the ALFAs contracts may be expected to finish in-the-money with a standard deviation equal to $$\frac{\sqrt{N}}{2},$$

where N is the number of separate ALFAs contracts outstanding, because the number of alternatively, "successes") produced by flipping a coin N times follows a binomial distribution with parameters N and p=½. (The statistical properties of the binomial distribution are well known.) In this example, because the ALFAs contracts are pair-wise independent with 50-50 outcomes, the financial institution's book of ALFAs contracts is self-hedging because percentage volatility of the financial institution's P&L decreases as the number of outstanding ALFAs contracts increases.

For example, if the financial institution sells ALFAs contracts (for example, having different underlyings and performance periods) having an aggregate notional amount of 1,000,000 then the financial institution is at risk of incurring a 3σ loss of $948,683 (=

$$\left(=3\times\frac{\sqrt{10}}{2}\times\left[2\times\frac{\$1{,}000{,}000}{10}\right]\right)$$

if only 10 ALFAs contracts were sold; a 3σ loss of $300,000 (=

$$\left(=3\times\frac{\sqrt{100}}{2}\times\left[2\times\frac{\$1{,}000{,}000}{100}\right]\right)$$

if 100 contracts were sold; a 3σ loss of $94,868 (=

$$\left(=3\times\frac{\sqrt{1000}}{2}\times\left[2\times\frac{\$1{,}000{,}000}{1000}\right]\right)$$

if 1,000 contracts were sold; and a 3σ loss of $42,426 (=

$$\left(=3\times\frac{\sqrt{5000}}{2}\times\left[2\times\frac{\$1{,}000{,}000}{5000}\right]\right)$$

if 5,000 ALFAs contracts were sold. Thus, the risk to the financial institution with respect to any particular ALFAs contract is reduced as the number of ALFAs contracts outstanding increases. It should be noted, however, that while this self-hedging effect is expected to apply to the financial institution, it is expected to apply to a proportionally lesser extent for any given counterparty (that enters into a proportionally smaller pool of ALFAs contracts than the financial institution). As a result, the counterparty will generally have a greater risk of loss and opportunity for gain on its portfolio of ALFAs contracts than the financial institution will have on its portfolio.

In an exemplary embodiment, risk management module 7 adjusts the price (i.e., premium or payout) for ALFAs contracts that trading engine 3 provides to clients based on the number of outstanding ALFAs contracts and the risk tolerance of the financial institution selling the ALFAs contracts. The price adjustments made by risk management module 7 may reflect, for example, an increase in the number of total outstanding contracts (in which case the premium pricing may be adjusted downward or the winner payout may be adjusted upward), the financial institution's risk level and any other economic requirement of the financial institution.

Consider an example of how the financial institution may adjust the premium when more contracts are written. Suppose the financial institution is not willing to make less than 1% of the expected total winner payout it must provide the counterparty even in the event of a 3σ loss. With an expected $1,000,000 total winner payout split over 10 contracts, each with a winner payout of $200,000, the 3σ payout over the expected payout is $948,683. Therefore, the financial institution must charge a premium p of $$10\times P-\$200{,}000\times 5-\$948{,}683=-10\%\times \$200{,}000\times 5\Rightarrow P=\$184{,}863$$

or over 102% of the winner payout. This trade is not economically viable for the counterparty. On the other hand, with 5,000 contracts, the financial institution must charge $$5{,}000\times P-\$400\times 2{,}500-\$42{,}426=-10\%\times \$400\times 2{,}500\Rightarrow P=\$188.5$$

or only 57% of the winner payout.

Consider an example of how the financial institution may adjust the winner payout when more contracts are written. Suppose the financial institution is not willing to make less than 1% of the premium it receives from the counterparty even in the event of a 3σ loss. With $1,000,000 total premium split over 10 contracts (therefore, costing $100,000 apiece), maximum winner payout the financial institution is willing to provide is $$\$1{,}000{,}000-(5+3\times 1.58)\times \text{Payout}_{winner}=-10\%\times \$1{,}000{,}000 \Rightarrow \text{Payout}_{winner}=\$112{,}936$$

or just 8% less than the premium charged. This trade is not economically viable for the counterparty. On the other hand, with 5,000 contracts (costing $200 apiece), the financial institution will be willing to provide a maximum winner payout of $$\$1{,}000{,}000-(2{,}500+3\times 35)\times \text{Payout}_{winner}=-10\%\times \$1{,}000{,}000 \Rightarrow \text{Payout}_{winner}=\$422$$

or 73% over the premium charged.

As explained above, the financial institution's book of outstanding ALFAs contracts is self-hedging when the ALFAs contracts behave according to a binomial distribution. In order to manage the risk associated with a book of ALFAs contracts that deviate from a binomial distribution, according to an exemplary embodiment, risk management module 7 may screen each client purchase request to determine the impact such a transaction will have on the financial institution's overall ALFAs risk and adjust the pricing of the transaction to account for any unacceptable risk. For example, risk management module 7 may screen a particular client's ALFAs portfolio for adequate diversification by determining whether the client's ALFAs+/ALFAs− selections appear overly concentrated by industry membership, price momentum, earnings yield, foreign exchange exposure, volatility, dividend yield, growth rate, leverage, trading volume, earnings variability, size, stock price, credit outlook, stock loan temperature, historic beta, predicted beta, time-series predictability of specific return and/or by other risk factors. It is because vendor factor models proxy for the true, but unknown, theoretical model that risk management module 7 looks for residual exposure to a variety of possible risk factors.

In addition to screening ALFAs contracts for unusual concentrations and lack of diversification, other preventative measures may be taken to limit the risk to the financial institution that may result from a client's trading strategy. These measures may include, by way of non-limiting example; limiting the notional size of the ALFAs contracts offered (for example, up to $25,000,000) to any single client in any given month so that that the risk exposure to the financial institution is limited. Another measure is offering ALFAs contracts only for large-capitalization stocks (or, potentially more precisely, those equity securities that trade at least $1,000,000 total value per day over the past [20] trading days) thereby increasing the difficulty in manipulating the ALFAs contract payouts by manipulating the market in the underlying stocks.

In an exemplary embodiment, if risk management module 7 determines that ALFAs contract selection generates excessive risk, then it causes the ALFAs contract payout amount to be adjusted in order to minimize the financial institution's risk. For example, the payout of certain ALFAs contracts may be increased so that any particular client's ALFAs contract portfolio conforms to the financial institution's risk tolerances. Also, the spread in payouts between ALFAs+ and ALFAs− contracts may be adjusted.

Consider the following example of how the winner payout or premium pricing may be adjusted to encourage clients to trade in such a way that the diversification of the financial institution's portfolio is increased. Assume each ALFAs contract costs $10,000 and that a counterparty wants to transact in ALFAs in 100 different stocks. The financial institution will perturb the winner payoff or premium charged on the contract on stock i, i=1, . . . , 100 by $$\$50\times(\tilde{R}_i>0)-\$50\times(\tilde{R}_i\leq 0)$$

where $\tilde{R}_i$ is stock i's realization of a standard normal random variate. Simply put, the financial institution randomly perturbs the premium or the winner payout up or down by $50 based on realizations of random variables.

Once a client purchase request is received and approved by trading engine 3, trading engine 3 forwards the transaction details to sub-ledger database 9. In an exemplary embodiment, sub-ledger database 9 provides a unique CUSIP for each ALFAs contract and records for each contract the name of the underlying stock, price, time stamp, ALFAs+/− designation and the winner and loser payout amount. Sub-ledger database 9 communicates ALFAs contract transaction information to a books and records database 11 operated by the financial institution for incorporating the ALFAs contract transactions in the institution's books and records.

Also, once ALFAs contract transaction requests are accepted by trading engine 3, trading engine 3 communicates the transaction details to a reporting module 13 for generating a trade confirmation and forwarding the confirmation to the client.

Once the performance period concludes, trading engine 3 calculates the winning and losing ALFAs contracts based on the specific return on the underlying assets for the performance period. First, trading engine 3 calculates the specific return on each day in the performance period based on the common return data received from a common return data source 15 (such as, for example, BARRA) and real-time market data received from real-time market data source 17.

Consider an example of a specific return calculation. A factor model provider (such as Barra, Inc.) provides the following information for Stock A pertinent to a given trade date:

| Factor | Factor Loading for stock A | Factor Return (Y) | X * Y |
|---|---|---|---|
| Size | 1.2 | −0.0326 | −0.03912 |
| Size non-linear | 0.8 | 0.0211 | 0.01688 |
| Momentum | −2.3 | −0.0419 | 0.09637 |
| Volatility | −1.8 | 0.027 | −0.0486 |
| Information Technology Industry Exposure | 100% | −0.0561 | −0.0561 |
| | | Common factor return (sum) = | −0.03057 | where the factor return column is the factor return for each of the 5 factors on that day, the common factor return component of each factor of Stock A is the X*Y column and the sum (the value −3.057%) is the common factor return of Stock A. The total return (including dividends) on stock A for this trade date is 5.61%. The risk-free rate is 0.005%. The corresponding specific return is $$= 5.61\% - 0.005\% - 3.057\%$$

$$= 2.548\%$$

that is, the specific return is the total return less the risk-free rate less the common factor return.

Once the specific return on each day in the performance period is calculated, the specific return for the performance period is calculated by taking the product of the gross specific returns (i.e., 1+the raw returns) for each day within the performance period. For example, if the performance period is five days and the five daily specific returns are 3%, −2%, 5%, −9% and 4%, then the specific return on the performance period (in %) is 0.306% ([(1.03)× (0.98)×(1.05)×(0.91)×(1.04)−1]×100%). After calculating the specific return for the performance period for the underlying associated with a particular ALFAs contract, trading engine 3 determines that an ALFAs+ contract is a winner if the specific return is greater than zero and that an ALFAs− contract is a winner if the specific return is less than zero. In another exemplary embodiment, trading engine 3 determines whether an ALFAs contract is a winning/losing contract if the specific return on the underlying assets meets any other desired criteria. Trading engine 3 then communicates this valuation information (i.e., winning/losing ALFAs contracts) to reporting module 13 for preparing a Notice of Valuation and Settlement to be forwarded to the client.

In the embodiment described above, a winning ALFAs contract pays a first payout that provides the investor with a return while a losing ALFAs contract pays a second payout (such as, for example, $0) that represents a loss to the investor. In an exemplary embodiment, instead of having a binary return, the ALFAs contract may provide a payout based on a percentage change in the specific return on the underlying asset over the performance period. For example, if the specific return over the performance period increased by 10%, then an ALFAs+ contract may provide a payout of 110% of the premium paid by the client.

In an exemplary embodiment, the winner payout is made contingent on the credit rating (provided by a rating agency such as Standard & Poor's, Moody's or Fitch) of a company (e.g., that issued the stock referenced by the ALFAs contract)

not falling/rising by a pre-specified number of rating levels over a pre-specified period. The pricing (premium/payout) of the ALFAs may be adjusted accordingly to reflect the added risk of the contingency.

In an exemplary embodiment, the winner payout is made contingent on the requirement that the underlying stock has the lowest/highest daily total returns among the stocks in its Peer Basket during a pre-specified Contingency Event period. The Peer Basket may be defined as any collection of stocks. One possibility is to select a number of stocks, for example, 199 stocks, nearest in market capitalization to the stock the ALFAs contract is written on as of the trade date that also exist on the final maturity date of the contract.

Accordingly, a system and method is provided for providing investors with a financial contract having a return that is linked to a specific return on an underlying asset. Thus, the financial contract of the present invention lets investors leverage their superior knowledge and stock-picking skills to achieve a return.

A number of embodiments of the present invention have been described. Nevertheless, it will be understood that various modifications may be made without departing from the spirit and scope of the invention. Based on the above description, it will be obvious to one of ordinary skill to implement the system and methods of the present invention in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Furthermore, alternate embodiments of the invention that implement the system in hardware, firmware or a combination of both hardware and software, as well as distribute modules and/or data in a different fashion will be apparent to those skilled in the art and are also within the scope of the invention. In addition, it will be obvious to one of ordinary skill to use a conventional database management system such as, by way of non-limiting example, Sybase, Oracle and DB2, as a platform for implementing the present invention. Also, network access devices can comprise a personal computer executing an operating system such as Microsoft Windows™, UniX™, or Apple Mac OS™, as well as software applications, such as a JAVA program or a web browser. Client access device 5 can also be a terminal device, a palm-type computer, mobile WEB access device or other device that can adhere to a point-to-point or network communication protocol such as the Internet protocol. Computers and network access devices can include a processor, RAM and/or ROM memory, a display capability, an input device and hard disk or other relatively permanent storage. Accordingly, other embodiments are within the scope of the following claims.

Thus, it will be seen that the objects set forth above, among those made apparent from the preceding description, are efficiently attained and, since certain changes may be made in carrying out the above process, in a described product, and in the construction set forth without departing from the spirit and scope of the invention, it is intended that all matter contained in the above description shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

The invention claimed is:

1. A computer implemented method for supporting a financial contract having a payout based on payout criteria linked to a specific return on at least one underlying asset, said method being implemented using a computer system comprising one or more programmable processors operatively connected to a data storage system, said method comprising:

calculating, using at least one of said programmable processors, valuation data for a financial contract having payout criteria based on the specific return on an asset over a performance period, and at least one payout amount associated with the payout criteria, wherein calculating the valuation data comprises:

determining, using at least one of said programmable processors, the specific return on the asset for the performance period using:

a total return associated with the asset for the performance period;

a risk-free return for the performance period; and a common factor return associated with the asset for the performance period; and wherein at least one of the total return, risk-free return, common factor and payout criteria are retrieved from the data storage system; and calculating, using at least one of said programmable processors, the valuation data for the financial contract using the determined specific return and the payout criteria; and communicating, using at least one of said programmable processors, the valuation data to a reporting module.

2. The method of claim 1, wherein calculating the valuation data is performed using a first payout amount if the specific return is greater than zero, and a second payout amount if the specific return is less than zero.

3. The method of claim 2, wherein a premium is associated with the financial contract; and wherein the first payout amount is greater than the premium.

4. The method of claim 3, wherein the second payout amount is less than the premium.

5. The method of claim 2, wherein a premium is associated with the financial contract; and wherein the second payout amount is greater than the premium.

6. The method of claim 5, wherein the first payout amount is less than the premium.

7. The method of claim 1, wherein calculating the valuation data further includes:

determining, using at least one of said programmable processors, the payout amount using a percentage change in the specific return over the performance period.

8. The method of claim 1, further comprising:

receiving, using at least one of said programmable processors, a request to purchase the financial contract for a premium;

determining, using at least one of said programmable processors, risk associated with the requested financial contract; and adjusting, based on said risk, using at least one of said programmable processors, at least one price, wherein the price is selected from one of said premium and said payout amount.

9. The method of claim 1, further comprising:
  receiving, using at least one of said programmable processors, a request to purchase the financial contract for a premium;
  determining, using at least one of said programmable processors, risk associated with the requested financial contract; and
  offsetting, using at least one of said programmable processors, the risk associated with the financial contract with corresponding risk associated with at least another financial contract.

10. The method of claim 1, wherein the financial contract is one of a plurality of outstanding financial contracts and wherein the method further comprises:
  determining, using at least one of said programmable processors, whether the plurality of outstanding financial contracts are priced in accordance with a plurality of risk factors.

11. The method of claim 10 wherein the risk factors are selected from a group of factors including industry membership, price momentum, earnings yield, foreign exchange exposure, volatility, dividend yield, growth rate, leverage, trading volume, earnings variability, size, stock price, credit outlook, stock loan temperature, historic beta, predicted beta and time-series predictability of specific return.

12. The method of claim 8, wherein the financial contract is one of a plurality of outstanding financial contracts and wherein the method further comprises:
  determining, using at least one of said programmable processors, whether the plurality of outstanding financial contracts are priced in accordance with a plurality of risk factors, wherein said risk factors are selected from a group of factors including: industry membership, price momentum, earnings yield, foreign exchange exposure, volatility, dividend yield, growth rate, leverage, trading volume, earnings variability, size, stock price, credit outlook, stock loan temperature, historic beta, predicted beta and time-series predictability of specific return, and wherein the step of adjusting, the at least one price includes adjusting the payout amount based on said plurality of risk factors.

13. The method of claim 8, wherein the step of adjusting the payout amount based on said risk includes:
  lowering the payout amount to compensate for said risk.

14. The method of claim 8, wherein the step of adjusting the payout amount based on said risk includes:
  increasing the premium for the financial contract to compensate for said risk.

15. The method of claim 1, wherein the performance period consists of a plurality of units of time and wherein the step of determining the specific return on the asset for the performance period includes the steps of:
  determining, using at least one of said programmable processors, a gross specific return on the asset for each of the plurality of units of time; and
  compounding, using at least one of said programmable processors, the determined gross specific returns on all of the plurality of units of time.

16. The method of claim 15, wherein the units of time are days.

17. The method of claim 1, wherein the performance period is one week.

18. The method of claim 1, wherein the asset is an equity security.

19. The method of claim 1, wherein the financial contract has a notional amount and the notional amount is limited to a notional amount ceiling.

20. The method of claim 19, wherein the notional amount ceiling is $25,000,000.

21. The method of claim 1, wherein the asset is a large-capitalization security.

22. The method of claim 21, wherein the security has a minimum daily traded value, and wherein the minimum daily traded value is $1,000,000.

23. The method of claim 1, further comprising:
  generating, using at least one of said programmable processors, trade confirmation data and forwarding the trade confirmation data to a client access device, wherein said trade confirmation data includes a winner and loser payout amount.

24. The method of claim 9, further comprising:
  adjusting, using at least one of said programmable processors and based on said risk, at least one price, wherein the at least one price is selected from the group consisting of: said premium and said the payout amount based on said risk.

25. The method of claim 9, wherein said financial contract and said at least another financial contract are purchased by clients, wherein each said financial contract and said at least another financial contract has a type, and wherein the sum of the financial contract and the said at least another financial contract is a number of financial contracts purchased by said clients, and wherein said risk depends from at least one variable selected from the group consisting of: said number of financial contracts purchased by said clients, and said type of financial contracts purchased by said clients.

26. The method of claim 1, wherein the common return data are received from a common return data source.

27. The method of claim 1, wherein the payout is made contingent on the credit rating of a company not changing by a pre-specified number of rating levels over a pre-specified period.

28. The method of claim 1, wherein the asset is a stock and the payout criteria specifies an obligation to pay a client the payout only where there is a positive specific return on the stock over the performance period.

29. The method of claim 1, wherein the asset is a stock and the payout criteria specifies an obligation to pay the client the payout only where there is a negative specific return on the stock over the performance period.

30. A computer system for supporting a financial contract having a payout amount based on payout criteria linked to a specific return on at least one underlying asset, comprising:
  a computer system comprising one or more programmable processors operatively connected to a data storage system, wherein said one more processors is configured to:
  calculate valuation data for a financial contract having payout criteria based on the specific return on an asset over a performance period, and at least one payout amount associated with the payout criteria by:
  determining the specific return on the asset for the performance period based upon:
  a total return associated with the asset for the performance period;
  a risk-free return for the performance period; and
  a common factor return associated with the asset for the performance period;
  determining valuation data for the financial contract based on the determined specific return and the payout criteria; and
  wherein said computer processor is adapted to communicate the valuation data to a reporting module.

* * * * *